(12) United States Patent
Perdomi et al.

(10) Patent No.: US 9,605,360 B2
(45) Date of Patent: Mar. 28, 2017

(54) POLYETHYLENE FIBER OR FILAMENT

(75) Inventors: Gianni Perdomi, Ferrara (IT); Fabiana Fantinel, Verona (IT); Roberto Vanzini, Francolino (IT); Shahram Mihan, Bad Soden (DE); Roberto De Palo, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 462 days.

(21) Appl. No.: 13/643,285

(22) PCT Filed: Apr. 21, 2011

(86) PCT No.: PCT/EP2011/056449
§ 371 (c)(1),
(2), (4) Date: Nov. 15, 2012

(87) PCT Pub. No.: WO2011/134897
PCT Pub. Date: Nov. 3, 2011

(65) Prior Publication Data
US 2013/0064995 A1  Mar. 14, 2013

Related U.S. Application Data

(60) Provisional application No. 61/401,038, filed on Aug. 6, 2010.

(30) Foreign Application Priority Data

Apr. 30, 2010 (EP) .................................... 10161540

(51) Int. Cl.
| | | |
|---|---|---|
| *D01F 6/04* | (2006.01) | |
| *C08L 23/04* | (2006.01) | |
| *D01F 6/30* | (2006.01) | |
| *D01F 6/46* | (2006.01) | |
| *E01C 13/08* | (2006.01) | |
| *C08F 210/16* | (2006.01) | |
| *C08L 23/08* | (2006.01) | |
| *C08L 23/10* | (2006.01) | |
| *C08L 23/12* | (2006.01) | |
| *C08L 23/16* | (2006.01) | |
| *C08L 23/20* | (2006.01) | |
| *C08L 23/22* | (2006.01) | |

(52) U.S. Cl.
CPC ............... *D01F 6/04* (2013.01); *C08L 23/04* (2013.01); *D01F 6/30* (2013.01); *D01F 6/46* (2013.01); *E01C 13/08* (2013.01); *C08F 210/16* (2013.01); *C08L 23/0815* (2013.01); *C08L 23/10* (2013.01); *C08L 23/12* (2013.01); *C08L 23/16* (2013.01); *C08L 23/20* (2013.01); *C08L 23/22* (2013.01); *C08L 2207/02* (2013.01)

(58) Field of Classification Search
CPC .......... C08L 23/16; C08L 23/20; C08L 23/10; C08L 2666/06; C08L 23/14; C08L 23/18; C08L 2205/035; C08L 51/06; C08L 23/06; C08L 23/0815; C08F 10/08; C08F 4/42; C08F 297/08; C08F 4/65912; C08F 110/08; C08F 210/08; C08F 210/16; C08F 4/6592; C08F 4/65908; C08F 4/65916; C08F 2500/12; C08F 2500/17; C08F 2500/19; C08F 2420/02; C08F 210/14; C08F 2500/08; C08F 2500/03; C08F 2500/02; C08F 2500/10; C08F 210/00; C08F 4/025; C08F 4/6546; C08F 23/0815; E01C 13/08; A41G 1/00; A41G 1/009; D05C 17/02; B32B 7/12; B32B 27/32; D02G 3/02; D02G 3/06; C09J 123/06; C09J 123/18; D01F 6/46; D03D 1/00; D03D 15/00; D03D 27/00; D01D 5/253; D01D 5/42; Y10T 428/23921; Y10T 428/2936; Y10T 428/23993; Y10T 428/23957
USPC ....... 524/543, 528, 430, 432, 537, 539, 599, 524/605; 525/240, 125.8; 526/348.6, 526/129, 156; 428/359, 17, 92, 95, 373, 428/397, 97, 36.9, 98, 87; 502/107, 120, 502/132
See application file for complete search history.

(56) References Cited

U.S. PATENT DOCUMENTS

| | | | | |
|---|---|---|---|---|
| 4,562,169 A | * | 12/1985 | Hagerty et al. | ............... 502/107 |
| 5,102,955 A | * | 4/1992 | Calabro et al. | ............... 525/240 |
| 6,339,134 B1 | * | 1/2002 | Crowther et al. | ............ 526/128 |
| 2006/0093783 A1 | * | 5/2006 | De Clerck | ....................... 428/92 |

FOREIGN PATENT DOCUMENTS

| | | | | |
|---|---|---|---|---|
| EP | 0472946 A2 | * | 3/1992 | |
| EP | 1279699 A1 | * | 1/2003 | |
| EP | 1972703 A1 | * | 9/2008 | |
| EP | 2374917 A1 | * | 10/2011 | |
| NO | WO 2007065644 A1 | * | 6/2007 | ............ C08F 110/02 |
| WO | WO 2005103095 A1 | * | 11/2005 | |

* cited by examiner

Primary Examiner — Arti Singh-Pandey

(57) ABSTRACT

A polymer filament or fiber comprising a polyethylene material (I) having the following features:
a) a density of 0.900 g/cm³ or higher;
b) a $MI_{21}$ value of 25 g/10 min.;
c) a MFR value from 25 to 60;
the said fiber being stretched by drawing with a draw ratio from 1.5 to 10.

12 Claims, No Drawings

POLYETHYLENE FIBER OR FILAMENT

This application is the U.S. national phase of International Application PCT/EP2011/056449, filed Apr. 21, 2011, claiming priority to European Patent Application 10161540.9 filed Apr. 30, 2010, and the benefit under 35 U.S.C. 119(e) of U.S. Provisional Application No. 61/401,038, filed Aug. 6, 2010; the disclosures of International Application PCT/EP2011/056449, European Patent Application 10161540.9 and U.S. Provisional Application No. 61/401,038, each as filed, are incorporated herein by reference.

The present invention concerns a polymer filament or fiber, in particular a polymer filament particularly suited for producing artificial turf.

The term "filament" is used in the definition of the present invention to make a distinction with respect to the fibers normally used for textile and carpeting applications. In fact it is known, as explained for example in WO2005/005730, that strands with heavy denier, often called "filaments", are required to prepare artificial turf structures. Thus the filaments according to the invention, also called, for the said reasons, "artificial turf filaments", are preferably characterized by a titre of at least 20 dTex.

To produce the final artificial turf structure, the filaments are normally fixed to a backing substrate.

The so obtained artificial turf is primarily used to substitute natural grass, in particular in sport fields.

As explained in WO2009/101124, for such applications as well as for other applications of artificial turf filaments, important and highly desirable properties are resistance to mechanical stress and wear, softness and UV resistance. In particular, high values of softness and UV resistance are generally achieved by using polyethylene materials as polyolefin component of the filament or fiber.

The polyethylene materials described in the above said document are produced by using metallocene catalysts in polymerization, and achieve valuable properties in terms of tenacity and elongation at break. In particular the highest values of elongation at break are of about 145-155%, as reported in the examples.

It has now been found that by selecting, as polyethylene component, a specific class of ethylene polymers, filaments or fibers are obtained with very high values of elongation at break, stress at break and tear resistance, in combination with other valuable properties, such as a low residual deformation and relatively low tangent modulus. The tear resistance is another important feature for use in artificial grass applications, as it prevents splitting of the filaments when subjected to mechanical stress. The low tangent modulus values are a measure of good flexibility and softness.

The said balance of elongation at break, stress at break and residual deformation is clearly desirable also for low titre fibres, for instance for textile applications, and is achieved to the maximum extent when the filaments and fibers are oriented by stretching.

Thus the present invention provides a polymer filament or fiber comprising a polyethylene material (I) having the following features:
a) a density of 0.900 g/cm³ or higher, preferably 0.925 g/cm³ or higher, in particular from 0.900 to 0.945 g/cm³ or preferably from 0.925 to 0.945 g/cm³;
b) a $MI_{21}$ value of 25 g/10 min. or greater, preferably of 30 g/10 min. or greater, more preferably of 35 g/10 min. or greater;
c) a MFR value from 25 to 60, preferably from 25 to 50, more preferably from 25 to 45 most preferably from 25 to 40, in particular from 25 to 35;
the said fiber being stretched by drawing with a draw ratio from 1.5 to 10.

As other components different from polyolefins can be present in the filament or fiber, it is to be understood that the polyethylene material (I) can constitute the overall polyolefin composition present in the filament or fiber, or be part of such polyolefin composition, and the total weight of the filament or fiber can be the sum of the said polyolefin composition (the polyolefin component) and of other components.

Density is determined in accordance with ISO 1183.

The ratio Mw/Mn is generally considered a measure of molecular weight distribution. Mw is the weight average molar mass, Mn is the number average molar mass, both measured by GPC (Gel Permeation Chromatography) as explained in detail in the examples.

$MI_{21}$ is the Melt Index at 190° C. with a load of 21.6 kg, determined according to ISO 1133.

The upper limit of $MI_{21}$ values is preferably of 50 g/10 min., more preferably of 45 g/10 min.

Thus, specific ranges of $MI_{21}$ values are from 25 to 50 g/10 min., preferably from 30 to 50 g/10 min., more preferably from 35 to 50 g/10 min., in particular from 35 to 45 g/10 min.

MFR means Melt Flow Rate and is the ratio of $MI_{21}$ to $MI_2$, where $MI_2$ is the Melt Index at 190° C. with a load of 2.16 kg, determined according to ISO 1133.

Preferably, the polyethylene material (I) is produced by using a metallocene-based catalyst. In particular, the metallocene-based catalyst comprises a hafnocene catalyst component, preferably a hafnocene catalyst component and an iron component having a tridentate ligand bearing at least two aryl radicals with each bearing a halogen or tert. alkyl substituent in the ortho-position.

The polyethylene material (I) can comprise ethylene homopolymers and/or copolymers of ethylene with higher α-olefins.

Preferably the polyethylene material (I) has the following additional feature:
d) a Mw/Mn value of 6 or greater, preferably of 7 or greater, more preferably of 8 or greater, most preferably of 9 or greater, the upper limit being, of 15, preferably of 12, for each of the said lower limits.

Other preferred features for the polyethylene material (I) are (independently from each other, or in any combination):
  a ratio of Eta-values Eta (vis)/Eta(GPC) of less than 0.95, more preferably less than 0.93 and particularly preferably, less than 0.90;
  a degree of long chain branching λ (lambda) of from 0 to 2 long chain branches/10000 carbon atoms and particularly preferably from 0.1 to 1.5 long chain branches/10000 carbon atoms;
  a Mw of from 50000 g/mol to 500 000 g/mol, more preferably from 100 000 g/mol to 300 000 g/mol and particularly preferably from 120 000 g/mol to 250 000 g/mol;
  from 0.01 to 20 branches/1000 carbon atoms;
  a z-average molar mass Mz of less than 1 Mio. g/mol, more preferably from 250 000 g/mol to 700 000 g/mol and particularly preferably from 300 000 g/mol to 500 000 g/mol.

Eta (vis) is the intrinsic viscosity as determined according to ISO 1628-1 and-3 in decalin at 135° C. Eta (GPC) is he viscosity as determined by GPC (gel permeation chromatography) according to DIN 55672, wherein 1,2,4-trichlorobenzene is used instead of THF and the determination is carried out at 140° C. instead of room temperature. The Eta (GPC) is calculated according to Arndt/Müller Polymer Charakterisierung, München 1996, Hanser Verlag, ISBN 3-446-17588-1 with the coefficients of the Mark-Houwing-equation (page 147, equation 4.93) for polyethylene being K=0.00033 dl/g and alpha=0.73, which is adjusted to 1,2, 4-trichlorobenzene at 140° C. by using the GPC-curve M-eta (page 148 and equation 4.94 lower part) to result in the Mark-Houwing- equation (4.93) the value for the intrinsic Viscosity [eta] in decalin with the values K=0.00062 dl/g and alpha=0.7 for decalin at 135° C.

The degree of long chain branching λ (lambda) is measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

The definition of z-average molar mass Mz is e. g. published in High Polymers Vol. XX, Raff and Doak, Interscience Publishers, John Wiley & Sons, 1965, S. 443.

The molar mass distribution of the polyethylene material (I) can be monomodal, bimodal or multimodal. In the present patent application, a monomodal molar mass distribution means that the molar mass distribution has a single maximum. A bimodal molar mass distribution means, for the purposes of the present patent application, that the molar mass distribution has at least two points of inflection on one flank starting from a maximum. The molar mass distribution is preferably monomodal or bimodal, in particular bimodal.

As previously said, the polyethylene material (I) has preferably from 0.01 to 20 branches/1000 carbon atoms. More preferably it has from 1 to 10 branches/1000 carbon atoms and particularly preferably from 3 to 8 branches/1000 carbon atoms. The branches/1000 carbon atoms are determined by means of $^{13}$C-NMR, as described by J. C. Randall, J. Macromol. Sci., Rev. Macromol. Chem. Phys. C29, 201-317 (1989), and refer to the total content of $CH_3$ groups/1000 carbon atoms.

The amount of the polyethylene material (I) with a molar mass of below 1 Mio. g/mol, as determined by GPC in the standard determination of the molecular weight distribution, is preferably above 95.5% by weight, more preferably above 96% by weight and particularly preferably above 97% by weight. This is determined in the usual course of the molar mass distribution measurement by applying the WIN GPC software.

The polyethylene material (I) has preferably at least 0.5 vinyl groups/1000 carbon atoms, preferably from 0.6 to 3 vinyl groups/1000 carbon atoms, more preferably from 0.7 to 2 vinyl groups/1000 carbon atoms, and particularly preferably from 0.8 to 1.5 vinyl groups/1000 carbon atoms. The content of vinyl groups/1000 carbon atoms is determined by means of FT-IR in accordance with ASTM D 6248-98. For the present purposes, the expression vinyl groups refers to —CH=$CH_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion.

The polyethylene material (I) preferably has at least 0.05 vinylidene groups/1000 carbon atoms, in particular from 0.1 to 1 vinylidene groups/1000 carbon atoms and particularly preferably from 0.14 to 0.4 vinylidene groups/1000 carbon atoms. The determination is carried out in accordance with ASTM D 6248-98.

The polyethylene material (I) preferably has from 0.1 to 20 branches of side chains larger than $CH_3$/1000 carbon atoms, in particular side chains from $C_2$-$C_6$/1000 carbon atoms, more preferably from 1 to 10 branches of side chains larger than $CH_3$/1000 carbon atoms, in particular side chains from $C_2$-$C_6$/1000 carbon atoms and particularly preferably from 2 to 6 branches of side chains larger than $CH_3$/1000 carbon atoms, in particular side chains from $C_2$-$C_6$/1000 carbon atoms. The amount of branches of side chains larger than $CH_3$/1000 carbon atoms are determined by means of $^{13}$C-NMR, as determined by James C. Randall, JMS-REV. Macromol. Chem. Phys., C29 (2&3), 201-317 (1989), and refer to the total content of side chains larger than $CH_3$ groups/1000 carbon atoms (without end groups). It is particularly preferred in polyethylene material (I) with butene-1, hexene-1 or octene-1 as the α-olefin comonomer to have 0.01 to 20 ethyl, butyl or hexyl side branches/1000 carbon atoms, more preferably from 1 to 10 ethyl, butyl or hexyl side branches/1000 carbon atoms and particularly preferably from 2 to 6 ethyl, butyl or hexyl side branches/1000 carbon atoms. This refers to the content of ethyl, butyl or hexyl side chains/1000 carbon atoms without the end groups.

While preferably the polyolefin component in the filament or fiber of the present invention substantially consists of polyethylene (I) as defined above, in another embodiment the filament or fiber of the present invention comprises:
A) 55%-95% by weight, preferably 65%-85% by weight of the polyethylene material (I) as defined above; and
B) 5-45% by weight, preferably 15-35% by weight of an elastomeric or plastomeric polyolefin or polyolefin composition;
the amounts of A) and B) being referred to the total weight of the polyolefin component present in the filament or fiber.

The artificial turf filaments according to the present invention are also typically characterized by a rounded (circular, oval or even more complex, like multilobal) cross-section, or by an angular, like rectangular, cross-section.

The filaments having rounded cross-section are also called "monofilaments" while those having angular and in particular rectangular cross-section are also called "tapes". Thus the definition of "filament" according to the present invention comprises the said monofilaments and tapes.

Preferably the tapes have a thickness from 0.03 to 1 mm and width from 2 to 20 mm. As previously said, the filaments of the present invention are preferably characterized by a titre of at least 20 dTex.

Particularly preferred titre values for the filaments of the present invention are of at least 50 dTex, especially of at least 100 or 200, in particular of at least 500 dTex, the upper limit being preferably of 1000 dTex for monofilaments and of 25000 dTex for tapes.

As previously mentioned, the filament according to the present invention is preferably stretched by drawing. Particularly preferred are draw ratios from 1.5 to 10, in particular from 3 to 10. These preferred draw ratios apply also to the fibers.

All the said filaments can be used in the form of bundles for preparation of the artificial turf structures. The number of individual filaments in a single bundle is preferably up to 20. Filaments made of different polymer materials, like for instance polypropylene or polyamide, can be present in the bundles.

The bundles can be held together by one or more wrapping filaments, generally of polymer materials, like polypropylene or polyethylene, such wrapping filaments being preferably bonded to one another and/or with the bundled filaments of the present invention.

Another way of obtaining bundles of filaments is by fibrillation of tapes having relatively large width.

Moreover the filaments can comprise components made of materials different from polyolefins, like embedded reinforcing fibers, made for example of polyamide.

From the above definitions of copolymers it is evident that the term "copolymer" includes polymers containing more than one kind of comonomers.

All the α-olefins hereinafter reported as comonomers in olefin copolymers, are selected from olefins having formula $CH_2=CHR$ wherein R is an alkyl radical, linear or branched, or an aryl radical, having the appropriate number of carbon atoms; thus, for instance, from 1 to 10 carbon atoms for $C_3$-$C_{12}$ α-olefins, or from 2 to 10 carbon atoms for $C_4$-$C_{12}$ α-olefins.

Specific examples of $C_3$-$C_{12}$ α-olefins are propylene, butene-1, pentene-1, 4-methylpentene-1, hexene-1, octene-1 and decene-1.

As α-olefin comonomers which can be present, either individually or in a mixture with one another, in addition to ethylene in the ethylene copolymer part of the polyethylene material (I), the above said $C_3$-$C_{12}$ α-olefins are preferred.

Specific examples of preferred comonomers in the polyethylene material (I) are butene-1, hexene-1 and octene-1. Particularly preferred is hexene-1.

As previously said, the polyethylene material (I) can be prepared by using a metallocene-based catalyst system in the polymerization process.

Metallocene catalysts are known in the art.

Preferred examples of metallocene-based catalyst systems and polymerization processes for preparing the polyethylene material (I) are disclosed in WO2005/103095.

In particular, as explained in the said WO2005/103095, the polyethylene material (I) can be prepared by using a catalyst composition comprising two different polymerization catalysts, of which one is based on a hafnocene compound and the other is based on an iron complex having a tridentate ligand bearing at least two aryl radicals with each bearing a halogen or tert. alkyl substituent in the ortho-position.

Hafnocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

A specific example of hafnocene compound is bis(n-butylcyclopentadienyl)hafinium dichloride.

Preferred iron complexes are 2,6-bis[1-(2-tert.butylphenylimino)ethyl]pyridine iron(II) dichloride, 2,6-bis[1-(2-tert.butyl-6-chlorophenylimino)ethyl]pyridine iron(II) dichloride, 2,6-bis[1-(2-chloro-6-methylphenylimino)ethyl] pyridine iron(II) dichloride, 2,6-bis[1-(2,4-dichlorophenylimino)ethyl]pyridine iron(II) dichloride, 2,6-bis[1-(2,6-dichlorophenylimino)ethyl]pyridine iron(II) dichloride, 2,6-bis[1-(2,4-dichlorophenylimino)methyl]pyridine iron(II) dichloride, 2,6-bis[1-(2,4-dichloro-6-methyl-phenylimino) ethyl]pyridine iron(II) dichloride, 2,6-bis[1-(2,4-difluorophenylimino)ethyl]pyridine iron(II) dichloride, 2,6-bis[1-(2, 4-dibromophenylimino)ethyl] pyridine iron(II) dichloride or the respective trichlorides, dibromides or tribromides.

The molar ratio of the hafnocene compound to the iron complex is usually in the range from 1:100 to 100:1, particularly preferably from 12:1 to 8:1.

In addition to the said components, an activating compound, in particular an aluminoxane, is generally used. As aluminoxanes, it is possible to use, for example, the compounds described in WO00/31090.

A particularly useful aluminoxane compound is methylaluminoxane.

It has been found to be advantageous to use the hafnocene compound or the iron complex and the aluminoxane compounds in such amounts that the atomic ratio of aluminum from the aluminoxane compounds, including any aluminum alkyl still present, to the transition metal from the hafnocene compound, be in the range from 1:1 to 2000:1, preferably from 10:1 to 500:1 and in particular in the range from 20:1 to 400:1. The atomic ratio of aluminum from the aluminoxane compounds, including any aluminum alkyl still present, to the iron from the iron complex, is usually in the range from 1:1 to 2000:1, preferably from 10:1 to 500:1 and in particular in the range from 20:1 to 400:1.

The said catalyst systems can be conveniently supported on organic or inorganic supports, like porous polymer particles or silica.

Conventional molecular weight regulators known in the art, such as chain transfer agents (e.g. hydrogen or $ZnEt_2$), may be used.

The process for producing the polyethylene material (I) can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

Specific examples of polymerization processes are provided in the said WO2005/103095.

The elastomeric or plastomeric polyolefin or polyolefin composition B) that can be used in the filament or fiber of the present invention can be any elastomeric or plastomeric polymer or polymer composition commonly used to modify the mechanical properties of polyolefins. The term "plastomeric" in the definition of the present invention is used to include the particular class of materials having properties intermediate to those of thermoplastic and elastomeric materials, generally called "plastomers". Said polyolefin plastomers can have a broad range of densities (up to about 0.90 g/cm$^3$) and a higher crystallinity than the traditional elastomers.

Be it an elastomeric or plastomeric material, the said component B) typically has at least one of the following features:

Flexural modulus (ISO 178A) equal to or less than 200 MPa, preferably equal to or less than 170 MPa, most preferably equal to or less than 100 MPa;

Shore D hardness equal to or less than 50 points, more preferably equal to or less than 45 points and most preferably equal to or less than 40 points;

Shore A hardness equal to or less than 90 points;
X-ray crystallinity from 0 to 40%, preferably from 0 to 30%.

Preferred examples of B) are heterophasic polyolefin compositions comprising (i) one or more crystalline propylene homopolymer(s) or copolymer(s) of propylene with up to 10% by weight of ethylene and/or other α-olefin comonomer(s), or combinations of said homopolymers and copolymers, and (ii) a copolymer or a composition of copolymers of ethylene with other α-olefins and optionally with minor amounts of a diene (typically from 1 to 10% with respect to the weight of (ii)), containing 15% or more, in particular from 15% to 90%, preferably from 15 to 85% of ethylene.

Preferred amounts of said components (i) and (ii) in B) are from 5 to 60% by weight, more preferably from 10 to 50% by weight of (i) and from 40 to 95% by weight, more preferably from 50 to 90% by weight of (ii), referred to total weight of (i) and (ii).

In particular, the said α-olefin comonomers in the said heterophasic compositions are selected from $C_4$-$C_{10}$ α-olefins for component (i) and $C_3$-$C_{10}$ α-olefins for component (ii).

The heterophasic compositions particularly useful as component B) typically have a MI (determined according to ISO 1133 with a load of 2.16 kg at 230° C.) ranging from 0.1 to 50 g/10 minutes, preferably from 0.5 to 20 g/10 minutes.

Particular and preferred examples of B) are the heterophasic polyolefin compositions (II) comprising (weight percentages):
i) 5-60%, preferably 10-50% of one or more propylene homopolymer(s) insoluble in xylene at room temperature in an amount of more that 80%, in particular from 85 to 99%, or one or more copolymer(s) of propylene with ethylene and/or $C_4$-$C_{10}$ α-olefin(s), containing 90% or more of propylene, and being insoluble in xylene at room temperature in an amount of more that 80%, in particular from 85 to 95%, or combinations of said homopolymers and copolymers;
ii) 40-95%, preferably 50-90% of a fraction of one or more copolymer(s) of ethylene with propylene and/or $C_4$-$C_{10}$ α-olefin(s), and optionally minor quantities of a diene, said copolymer(s) containing from 15 to 45%, preferably from 18 to 40% of ethylene, and having solubility in xylene at ambient temperature of 50% by weight or greater, preferably of 70% by weight or greater.

The preferred comonomer in the propylene copolymers of component (i) is ethylene.

The preferred comonomer in the propylene copolymers of fraction (ii) is propylene.

When present, the diene in the heterophasic composition B) preferably ranges from 1 to 10%, more preferably 2.5-7% by weight with respect to the total weight of fraction (ii). Examples of dienes are butadiene, 1,4-hexadiene, 1,5-hexadiene, and 5-ethylidene-2-norbornene.

The said heterophasic compositions can be prepared by blending components (i) and (ii) in the molten state, that is to say at temperatures greater than their softening or melting point, or more preferably by sequential polymerization in the presence of a Ziegler-Natta catalyst as previously defined.

Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823.

These metallocene catalysts may be used in particular to produce the fraction (ii).

The above mentioned sequential polymerization process for the production of the heterophasic composition comprises at least two stages, where in one or more stage(s) propylene is polymerized, optionally in the presence of the said comonomer(s), to form component (i), and in one or more additional stage(s) mixtures of ethylene with said $C_3$-$C_{10}$ alpha-olefin(s), and optionally diene, are polymerized to form fraction (ii).

The polymerization processes are carried out in liquid, gaseous, or liquid/gas phase. The reaction temperature in the various stages of polymerization can be equal or different, and generally ranges from 40 to 90° C., preferably from 50 to 80° C. for the production of component (i), and from 40 to 60° C. for the production of (ii).

Examples of sequential polymerization processes are described in European patent applications EP-A-472946 and EP-A-400333 and in WO03/011962.

Other preferred examples of B) are:
1) butene-1 (co)polymers having:
   a content of butene-1 derived units of 80% by weight or more;
   flexural modulus of 60 MPa or less;
2) propylene copolymers containing up to 40% by weight of an olefin comonomer, preferably ethylene or a $C_4$-$C_{10}$ α-olefin, and having Shore A hardness of 90 points or less;
3) ethylene copolymers containing up to 45% by weight, in particular from 10 to 40% by weight, of an olefin comonomer, preferably a $C_3$-$C_{10}$ α-olefin, in particular butene-1 or octene-1, and having Shore A hardness of 90 points or less.

The term "butene-1 (co)polymers" as used herein refers to butene-1 homopolymers, copolymers with α-olefins and compositions thereof, having from elastomeric to plastomeric behaviour. The butene-1 (co)polymers 1) exhibit low flexural modulus and preferably low crystallinity (less than 40% measured via X-ray, preferably less than 30).

Preferred α-olefins which are or may be present as comonomers in the butene-1 (co)polymers 1) are selected from ethylene, propylene and $C_5$-$C_8$ α-olefins. Particularly preferred as comonomers are propylene and ethylene.

Preferred values of MI (determined according to ISO 1133 with a load of 2.16 kg at 190° C.) for the butene-1 (co)polymers 1) are from 0.5 to 50 g/10 min.

Such (co)polymers are known in the art and can be obtained by polymerization in the presence of Ziegler-Natta catalysts, as disclosed for instance in WO2006/042815, or metallocene catalysts, as disclosed for instance in WO2004/099269 and in WO2009/000637. The polymers produced according to the teaching of said WO2006/042815 typically have a percent of isotactic pentads (mmmm) from 25 to 56%.

Preferred examples of propylene copolymers 2) are the propylene copolymers containing from 0.1 to 40% by weight, more preferably from 0.1 to 25% by weight of olefin comonomers, in particular ethylene.

The said propylene copolymers have typically a density from 0.850 to 0.890 g/cm$^3$, in particular from 0.855 to 0.885 g/cm$^3$. They generally display no or relatively low degree of crystallinity, indicatively from 0 to 25% when measured as X-ray crystallinity.

Other typical properties of propylene copolymers 2) are:
Shore A hardness equal to or less than 90 points, preferably equal to or less than 88 points, more preferably equal to or less than 75 points;
melting point, measured with differential scanning calorimetry (DSC) at a heating/cooling rate of 10-20° C., of 105° C. or less, preferably of 90° C. or less;

heat of fusion, measured with DSC under the said conditions, of 75 J/g or less;

molecular weight distribution, in terms of Mw/Mn (measured by gel permeation chromatography in trichlorobenzene at 135° C.) from 1.5 to 5.

In detail, for thr the determination of the molecular weight distribution of the propylene copolymers 2), the samples are prepared at a concentration of 70 mg/50 ml of stabilized 1,2,4 trichlorobenzene (250 μg/ml BHT (CAS REGISTRY NUMBER 128-37-0); the samples are then heated to 170° C. for 2.5 hours to solubilize; the measurements are run on a Waters GPCV2000 at 145° C. at a flow rate of 1.0 ml/min. using the same stabilized solvent; three Polymer Lab columns are used in series (Plgel, 20 μm mixed ALS, 300×7.5 mm)

Suitable propylene copolymers 2) are the plastomers Vistamaxx® and Versify® made available on the market by ExxonMobil Chemical and Dow Chemical.

Suitable ethylene copolymers 3) are the plastomers Exact® and Engage® made available on the market by ExxonMobil Chemical and Dow Chemical.

The polyolefin compositions that can be used for preparing the filament or fiber of the present invention (for instance the compositions containing the previously defined components A) and B)) are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful melt-mixing apparatus in this context are in particular extruders or kneaders, and particular preference is given to twin-screw extruders. It is also possible to premix the components at room temperature in a mixing apparatus.

During the preparation of the polyolefin compositions, besides the main components A) and B) and other optional polymer components, it is possible to introduce additives commonly employed in the art, such as stabilizing agents (against heat, light, U.V.), plasticizers, antiacids, antistatic and water repellant agents, pigments.

The polyolefin filament of the invention can be prepared by means of processes and apparatuses well known in the relevant art.

In general terms, the process for preparing polyolefin filaments according to the invention comprises the following steps:

(a) melting the polyethylene material (I) and the other polyolefin components, when present;
(b) spinning the filaments or extruding a precursor film or tape;
(c) optionally drawing the filaments or the precursor film or tape and/or cutting the precursor film or tape and optionally drawing the so obtained filaments, when no drawing is previously carried out;
(d) optionally finishing the filaments obtained from step (b).

The melting step (a) and the spinning or extrusion step (b) are generally carried out continuously in sequence by using mono- or twin-screw extruders, equipped with a suited spinning or extrusion head. Thus also the previously described melt-mixing step can be carried out in the same spinning or extrusion apparatus used in step (b).

The spinning heads comprise a plurality of holes with the same shape as the transversal section of the filament (monofilament or tape).

The film extrusion heads are generally flat or annular dies commonly used for the film preparation.

When a precursor film or tape is obtained in step (b), it is then processed in step (c) by cutting it into tapes having the desired size. When the drawing treatment is carried out on the precursor film or tape, it is consequently no longer required on the final filament.

Examples of finishing treatments can be fibrillation and crimping.

Fibrillation is generally carried out on tapes.

Typically the melting step (a) and the spinning or extrusion step (b) are carried out at the same temperatures as previously defined for the melt-mixing step, namely of from 180 to 310° C., preferably from 190 to 280° C., more preferably from 200 to 250° C.

Typical spinning conditions are:
temperature in the extruder head from 200 to 300° C.;
take-up speed for primary web (unstretched) from 1 to 50 m/min.

Typical film extrusion conditions are:
temperature in the extruder head from 200 to 300° C.;
output value from 20 to 1000 kg/hour (on industrial plants).

The filament or the precursor film obtained in step (b) are generally cooled by using for instance one or more chill rolls or by immersion in water at a temperature from 5 to 25° C.

To carry out the drawing treatment, the filament (monofilament or tape) or the precursor tape are previously heated at a temperature from 40 to 120-140° C. Heating can be achieved by using for example a hot air oven, a boiling water bath, heated rolls or by irradiation or other known means.

Drawing can be achieved by delivering the filament or the precursor tape through a series of rolls having different rotation speeds. Preferred ranges of draw ratios so achieved are those previously specified.

Fibrillation can be achieved by feeding the tape between rolls having means for cutting longitudinally and/or diagonally.

Fibers with lower denier than filaments, namely with a titre under 20 dTex, typically from 1 to 15 dTex, are prepared by extruding the polymer melt through the already described spinning heads, wherein the holes have a smaller diameter with respect to the diameter used for filaments. The fibers emerging from the spinning head are subsequently subjected to quenching and oriented by stretching in a manner similar to that described above with reference to the orientation of the filaments.

The apparatuses and spinning conditions typically used to prepare fibers are well known in the art.

As previously mentioned, the artificial turf is generally obtained by fixing the filaments or the said bundles of filaments to a substrate, generally called "backing".

Such backing can be for instance a polyolefin (in particular polypropylene) fiber mat.

Filling materials like sand and rubber particles, can be deposited over the backing.

The following examples are given for illustrating but not limiting purposes.

The following analytical methods are used to determine the properties reported in the description and in the examples.

Melt Index (MI): ISO 1133 with a load of 2.16 kg at 230° C. for propylene polymers, or with a load of 2.16 kg at 190° C. for butene-1 polymers and ethylene polymers ($MI_2$), or with a load of 21.6 kg at 190° C. for ethylene polymers ($MI_{21}$);

MFR ratio $MI_{21}/MI_2$;

Density: ISO 1183;

Flexural Modulus: ISO 178 on rectangular specimens 80×10×4 mm from T-bars ISO527-1 Type 1A;
Hardness Shore A/D: ISO 868.
Tear resistance
A LLOYDS LRX dynamometer is used, with the following settings.
  distance between clamps of 50 mm;
  test speed 50 mm/min.
Strips with 10 cm width are cut from the drawn precursor tape. From the strips test pieces having width in the middle of 12.7 mm are obtained. The middle portion is fixed to the upper clamp, while the two ends are fixed to the lower clamp.
The force required to tear the test piece along 50 mm is determined
Stress at Break, Elongation at Break and Tangent Modulus
Measured on the drawn precursor tapes according to ASTM D882-02, using a dynamometer INSTRON 4301, under the following conditions:
  test temperature of 23° C.;
  cross head speed of 500 mm/min., independently of the specimen elongation at break;
  distance between clamps of 50 mm.
Residual Deformation Test
Measured on the drawn precursor tapes according ASTM D5459-95 procedure but with following modified conditions:
  Tape width: 15 mm;
  Elongation speed: 500 mm/min;
  Clamp distance: 50 mm;
  Time wait at maximum elongation: 0 seconds;
  Time wait after crosshead return: 120 seconds.
Comonomer(s) Content
  Determined by $^{13}$C-NMR.
$^{13}$C-NMR measurements are performed on a polymer solution (8-12% by weight) in dideuterated 1,1,2,2-tetrachloro-ethane at 120° C. The $^{13}$C NMR spectra are acquired on a Bruker AV-600 spectrometer operating at 150.91 MHz in the Fourier transform mode at 120° C. using a 90° pulse, 15 seconds of delay between pulses and CPD (WALTZ16) to remove $^{1}$H-$^{13}$C coupling. About 1500 transients are stored in 32K data points using a spectral window of 60 ppm (0-60 ppm).
Copolymer Composition
Diad distribution is calculated from $^{13}$C NMR spectra using the following relations:

$PP = 100 I_1/\Sigma$ $PB = 100 I_2/\Sigma$ $BB = 100(I_3 - I_{19})/\Sigma$ $PE = 100(I_5 + I_6)/\Sigma$ $BE = 100(I_9 + I_{10})/\Sigma$ $EE = 100(0.5(I_{15} + I_6 + I_{10}) + 0.25(I_{14}))/\Sigma$ Where $\Sigma = I_1 + I_2 + I_3 - I_{19} + I_5 + I_6 + I_9 + I_{10} + 0.5(I_{15} + I_6 + I_{10}) + 0.25(I_{14})$ The molar content is obtained from diads using the following relations:

$P(m\%) = PP + 0.5(PE + PB)$ $B(m\%) = BB + 0.5(BE + PB)$ $E(m\%) = EE + 0.5(PE + BE)$ $I_1, I_2, I_3, I_5, I_6, I_9, I_6, I_{10}, I_{14}, I_{15}, I_{19}$ are integrals of the peaks in the $^{13}$C NMR spectrum (peak of EEE sequence at 29.9 ppm as reference). The assignments of these peaks are made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983). They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34 – 45.60 | $S_{\alpha\alpha}$ | PP |
| 2 | 44.07 – 42.15 | $S_{\alpha\alpha}$ | PB |
| 3 | 40.10 – 39.12 | $S_{\alpha\alpha}$ | BB |
| 4 | 39.59 | $T_{\delta\delta}$ | EBE |
| 5 | 38.66 – 37.66 | $S_{\alpha\gamma}$ | PEP |
| 6 | 37.66 – 37.32 | $S_{\alpha\delta}$ | PEE |
| 7 | 37.24 | $T_{\beta\delta}$ | BBE |
| 8 | 35.22 – 34.85 | $T_{\beta\beta}$ | XBX |
| 9 | 34.85 – 34.49 | $S_{\alpha\gamma}$ | BBE |
| 10 | 34.49 – 34.00 | $S_{\alpha\delta}$ | BEE |
| 11 | 33.17 | $T_{\delta\delta}$ | EPE |
| 12 | 30.91 – 30.82 | $T_{\beta\delta}$ | XPE |
| 13 | 30.78 – 30.62 | $S_{\gamma\gamma}$ | XEEX |
| 14 | 30.52 – 30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28 – 27.54 | $2B_2$ | XBX |
| 18 | 27.54 – 26.81 | $S_{\beta\delta} + 2B_2$ | BE, PE, BBE |
| 19 | 26.67 | $2B_2$ | EBE |
| 20 | 24.64 – 24.14 | $S_{\beta\beta}$ | XEX |
| 21 | 21.80 – 19.50 | $CH_3$ | P |
| 22 | 11.01 – 10.79 | $CH_3$ | B |

Determination of Isotactic Pentads Content
50 mg of each sample were dissolved in 0.5 mL of $C_2D_2Cl_4$.
The $^{13}$C NMR spectra were acquired on a Bruker DPX-400 (100.61 Mhz, 90° pulse, 12s delay between pulses). About 3000 transients were stored for each spectrum; mmmm pentad peak (27.73 ppm) was used as reference.
The microstructure analysis was carried out as described in literature (Macromolecules 1991, 24, 2334-2340, by Asakura T. et Al. . and Polymer, 1994, 35, 339, by Chujo R. et Al.).
The % value of pentad tacticity (mmmm %) so measured is the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and of those signals, falling in the same region, due to the α-olefin comonomer (e.g propylene derived units when present).
Determination of Isotacticity Index (Solubility in Xylene at Room Temperature, in % by Weight)
2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Molecular Weights Determination (Polyethylene material (I))

The determination of the molar mass distributions and the means Mn, Mw, Mz and Mw/Mn derived therefrom is determined by high-temperature gel permeation chromatography using a method described in ISO 16014-1:2003(E) and ISO 16014-4:2003(E): solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series is used. The solvent is vacuum distilled under nitrogen and is stabilized with 0.025 wt. -% of 2,6-di-tert-butyl-4-methylphenol. The flow rate used is 1 mL/min, the injection is 400 μL and polymer concentration is in the range of 0.01% <conc.<0.05% w/w. The molecular weight calibration is established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve is then adapted to Polyethylene (PE) by means of the Universal Calibration method according to ISO 16014-2:2003(E). The Mark-Houwing parameters used are for PS: $k_{PS}$=0.000121 dL/g, $\alpha_{PS}$=0.706 and for PE $k_{PE}$=0.000406 dL/g, $\alpha_{PE}$=0.725, valid in TCB at 135° C. Data recording, calibration and calculation is carried out using NTGPC_Control_V6.3.00 and NTGPC_V6.4.05 (hs GmbH, Hauptstraβe 36, D-55437 Ober-Hilbersheim), respectively.

Melting Temperature and Fusion Enthalpy

Determined by DSC according ISO 11357, part 3 with a heating rate of 20 K per minute.

Determination of X-ray Crystallinity

The X-ray crystallinity is measured with an X-ray Diffraction Powder Diffractometer using the Cu-Kα1 radiation with fixed slits and collecting spectra between diffraction angle 2Θ=5° and 2Θ=35° with step of 0.1° every 6 seconds.

Measurement are performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes. Then applying a pressure of about 10Kg/cm² for about few second and repeating this last operation for 3 times.

The diffraction pattern is used to derive all the components necessary for the degree of cristallinity by defining a suitable linear baseline for the whole spectrum and calculating the total area (Ta), expressed in counts/sec·2Θ, between the spectrum profile and the baseline.

Then a suitable amorphous profile is defined, along the whole spectrum, that separate, according to the two phase model, the amorphous regions from the crystalline ones. Thus it is possible to calculate the amorphous area (Aa), expressed in counts/sec·2Θ, as the area between the amorphous profile and the baseline; and the cristalline area (Ca), expressed in counts/sec·2Θ, as $$Ca=Ta-Aa$$

The degree of cristallinity of the sample is then calculated according to the formula:

$$\% Cr=100\times Ca/Ta$$

EXAMPLE 1 AND COMPARISON EXAMPLES 1 to 3

The following materials are used
Polyethylene Material (I)
PE-1: polyethylene material (I) wherein the copolymer portion contains hexene-1 comonomer units, having the properties reported in following Table I and prepared with the same catalyst and polymerization process as in Example 2 of WO2005/103095, but feeding 45 kg/T-ethylene of hexene-1 and 6 g/T-ethylene of hydrogen (wherein "T-ethylene" means ton of ethylene);
PE-2: polyethylene material with hexene-1 as comonomer, having the properties reported in following Table I, sold by Chevron Phillips with the trademark Marlex K203;
PE-3: polyethylene material with hexene-1 as comonomer, having the properties reported in following Table I, sold by Chevron Phillips with the trademark Marlex K306;
PE-4: polyethylene material with octene-1 as comonomer, having the properties reported in following Table I, sold by Dow with the trademark Dowlex SC2108G.

PE-2, PE-3 and PE-4 are comparison polyethylene materials.

All the polyethylene materials used for preparing the filaments are extruded in a Plasticizers MKII extruder equipped with a flat extrusion die, with die opening width and height of 80 mm and 250 μm respectively, thus obtaining a precursor tape.

The main extrusion conditions are:
Melt temperature of 250° C.;
Screw speed of 40 rpm;
Output of about 1kg/hour.

After cooling at room temperature through chill rolls, the precursor tape is heated by feeding it through hot rolls having a temperature of about 70° C. and drawn by feeding it through rolls with different rotation speeds. A draw ratio of 4 is obtained.

The cutting treatment is not carried out, as it is not required for testing the final properties. Such cutting treatment is required in practice to obtain filaments having the desired width and consequently the desired titre, which in the present case could for instance range from 2 to 15 mm and from 300 to 2000 dTex respectively, but does not affect the tested properties.

The final properties of the drawn precursor tape so obtained, measured after at least 7 days from extrusion, are reported in Table II.

TABLE I

| PE material | PE-1 | PE-2 | PE-3 | PE-4 |
|---|---|---|---|---|
| Eta(vis) (dl/g) | 1.46 | 2.35 | 2.42 | 1.72 |
| Eta(GPC) (dl/g) | 1.87 | 2.28 | 2.37 | 1.66 |
| Eta(vis)/Eta(GPC) | 0.78 | 1.03 | 1.02 | 1.04 |
| Vinyl groups (1/1000 C) | 1.0 | 0.81 | 0.89 | 0.35 |
| Octene-1 (wt %) | — | — | — | 3.15 |
| Hexene-1 (wt %) | 4.3 | 4.7 | 2.9 | — |
| Butene-1 (wt %) | — | 2.5 | — | — |

TABLE I-continued

| PE material | PE-1 | PE-2 | PE-3 | PE-4 |
|---|---|---|---|---|
| Density (g/cm³) | 0.9348 | 0.922 | 0.937 | 0.9355 |
| Mw | 114608 | 171225 | 181171 | 93983 |
| Mn | 10433 | 8082 | 9393 | 16480 |
| Mz | 375539 | 1584850 | 1412857 | 318998 |
| Mw/Mn | 10.99 | 21.19 | 19.29 | 5.7 |
| MI$_2$ (g/10 min.) | 1.42 | 0.205 | 0.096 | 2.44 |
| MI$_{21}$ (g/10 min.) | 41.66 | 17.66 | 11.93 | 57.46 |
| MFR | 29 | 86.1 | 124.3 | 23.5 |

TABLE II

| Example No. | 1 | Comp. 1 | Comp. 2 | Comp. 3 |
|---|---|---|---|---|
| PE used | PE-1 | PE-2 | PE-3 | PE-4 |
| Properties | | | | |
| Tape thickness (μm) | 114 | 110 | 120 | 111 |
| Tear resistance (N/mm) | 56.9 | 55.91 | 59.73 | 27.14 |
| Stress at break (MPa) | 112.7 | 107 | 119.3 | 96.3 |
| Elongation at break (%) | 180 | 161 | 130 | 303 |
| Tangent modulus (MPa) | 528 | 343 | 785 | 637 |
| Residual deformation before 2$^{nd}$ cycle | 58.8 | 72.4 | 75.2 | 63.4 |
| Residual deformation before 3$^{rd}$ cycle | 62.9 | 73.6 | 77.3 | 68.3 |
| Residual deformation before 4$^{th}$ cycle | 65.1 | 74.3 | 78.3 | 70.6 |
| Residual deformation before 5$^{th}$ cycle | 66.3 | 74.7 | 78.6 | 72 |
| Residual deformation before 6$^{th}$ cycle | 66.9 | 75.1 | 79.2 | 72.3 |

The invention claimed is:

1. A polymer filament or fiber comprising:
   A) 55-95% by weight of a polyethylene material
      (I) having the following features:
         a) a density of at least 0.900 g/cm3;
         b) an MI$_{21}$ value of 25-50 g/10 min.;
         c) an MFR value from 25-60;
         d) an Mw/Mn value of 6-15; and
         e) a titre of at least 20 dtex; wherein the filament or fiber is stretched by drawing with a draw ratio from 1.5 to 10 and comprises at least 0.5 vinyl groups/1000 carbon atoms;
   and B) 5-45% by weight of an elastomeric or plastomeric polyolefin or polyolefin composition; wherein the amounts of A and B) refer to the total weight of the polyolefin component present in the filament or fiber.

2. The polymer filament or fiber of claim 1, in a form of a monofilament or tape.

3. The polymer filament or fiber of claim 1, wherein component B) has at least one of the following features:—a Flexural modulus (ISO 178A) of at most 200 MPa;—a Shore D hardness of at most 50 points; and—a Shore A hardness of at most 90 points; and—an X-ray crystallinity from 0 to 40%.

4. The polymer filament or fiber of claim 1, wherein component B) is a heterophasic polyolefin composition comprising (i) at least one crystalline propylene homopolymer(s) or copolymer(s) of propylene with up to 10% by weight of at least one of ethylene and an a-olefin comonomer(s), or combinations of said homopolymers and copolymers, and (ii) a copolymer or a composition of copolymers of ethylene with other a-olefins and optionally with minor amounts of a diene, containing 15% or more of ethylene.

5. The polymer filament or fiber of claim 1, wherein component B) is selected from: 1) butene-1 (co)polymers having:—a content of butene-1 derived units of at least 80% by weight;—a flexural modulus of at most 60 MPa; 2) propylene copolymers containing up to 40% by weight of an olefin comonomer having a Shore A hardness of at most 90 points; or 3) ethylene copolymers containing up to 45% by weight of an olefin comonomer and having a Shore A hardness of at most 90 points.

6. The polymer filament or fiber of claim 5 wherein component 2) the olefin comonomer is ethylene or a C$_4$-C$_{10}$ alpha-olefin, and in component 3) the olefin comonomer is a C3-C$_{10}$ alpha-olefin.

7. A manufactured item comprising a plurality of containing the polymer filaments of claim 1.

8. An artificial turf structure comprising a plurality of the polymer filaments of claim 1.

9. The polymer filament or fiber of claim 8 wherein component A) is present in an amount from 65%-85% by weight and component B) is present in an amount from 15-35% by weight.

10. The polymer filament or fiber of claim 1 wherein the MI$_{21}$ value is at least 30 g/10 min.

11. The polymer filament or fiber of claim 10 wherein the MI$_{21}$ value is at least 35 g/10 min.

12. The polymer filament of claim 1, comprising a titre value of 50 dtex-1000 dtex.

* * * * *

UNITED STATES PATENT AND TRADEMARK OFFICE
CERTIFICATE OF CORRECTION

PATENT NO. : 9,605,360 B2
APPLICATION NO. : 13/643285
DATED : March 28, 2017
INVENTOR(S) : Gianni Perdomi et al.

Page 1 of 2

It is certified that error appears in the above-identified patent and that said Letters Patent is hereby corrected as shown below:

In the Specification

| | | |
|---|---|---|
| Column 2 | Line 15 | Delete "Mw/Mn" and insert --$M_w/M_n$-- |
| Column 2 | Line 16 | Delete "Mw" and insert --$M_w$-- |
| Column 2 | Line 17 | Delete "Mn" and insert --$M_n$-- |
| Column 2 | Line 43 | Delete "Mw/Mn" and insert --$M_w/M_n$-- |
| Column 2 | Line 56 | Delete "Mw" and insert --$M_w$-- |
| Column 2 | Line 61 | Delete "Mz" and insert --$M_z$-- |
| Column 3 | Line 21 | Delete "Mz" and insert --$M_z$-- |
| Column 9 | Line 3 | Delete "Mw/Mn" and insert --$M_w/M_n$-- |
| Column 9 | Line 6 | After "for", delete "thr" |
| Column 9 | Line 9 | Delete "µg/ml" and insert --µg/ml-- |
| Column 9 | Line 15 | After "mm)", insert --.-- |
| Column 11 | Line 15 | After "determined", insert --.-- |
| Column 11 | Line 57 | Delete "EE=100(0.5($I_{15}+I_6+I_{10}$)+0.25($I_{14}$)/Σ" and insert --EE=100(0.5($I_{15}+I_6+I_{10}$)+0.25($I_{14}$))/Σ-- |
| Column 13 | Line 14 | Delete "Mn, Mw, Mz and Mw/Mn" and insert --$M_n$, $M_w$, $M_z$ and $M_w/M_n$-- |
| Column 15 | Line 4 | In Table 1, delete "Mw" and insert --$M_w$-- |
| Column 15 | Line 5 | In Table 1, delete "Mn" and insert --$M_n$-- |
| Column 15 | Line 6 | In Table 1, delete "Mz" and insert --$M_z$-- |
| Column 15 | Line 7 | In Table 1, delete "Mw/Mn" and insert --$M_w/M_n$-- |

In the Claims

| | | |
|---|---|---|
| Column 15 | Line 38 | In Claim 1, delete "g/cm3;" and insert --$g/cm^3$;-- |
| Column 15 | Line 39 | In Claim 1, delete "an" and insert --a-- |
| Column 15 | Line 40 | In Claim 1, delete "an" and insert --a-- |
| Column 15 | Line 41 | In Claim 1, delete "an Mw/Mn" and insert --a $M_w/M_n$-- |
| Column 16 | Line 1 | In Claim 1, after "A", insert --)-- |
| Column 16 | Line 14 | In Claim 4, delete "a-olefin" and insert --α-olefin-- |

Signed and Sealed this
Twenty-ninth Day of October, 2019

Andrei Iancu
*Director of the United States Patent and Trademark Office*

Column 16   Line 17   In Claim 4, delete "a-olefins" and insert --α-olefins--
Column 16   Line 31   In Claim 6, delete "C3-$C_{10}$" and insert --$C_3$-$C_{10}$--